United States Patent [19]

Couderc

[11] 4,379,068

[45] Apr. 5, 1983

[54] HYDROPHILIC COTELOMERS HAVING A TERMINAL SULFONATE GROUP AND CONTAINING ACID AND AMINE FUNCTIONS, AND THEIR APPLICATION IN DETERGENT COMPOSITIONS

[75] Inventor: Pierre Couderc, Bethune, France

[73] Assignee: Societe Chimique des Charbonnages, Paris, France

[21] Appl. No.: 276,400

[22] Filed: Jun. 22, 1981

[30] Foreign Application Priority Data

Jun. 25, 1980 [FR] France ................... 80 14061

[51] Int. Cl.$^3$ ................................................ C11D 7/18
[52] U.S. Cl. .......................... 252/99; 252/98; 252/102; 252/174.24; 252/181; 252/526; 252/545; 252/DIG. 2; 252/DIG. 11; 260/507 R; 260/513 N; 526/303.1; 526/310; 526/317; 526/318
[58] Field of Search ........... 252/526, 545, 180, 174.24, 252/102, 99, 98, 90, DIG. 2, DIG. 11, 181; 260/507 R, 513 N; 560/151; 526/303.1, 310, 317, 318; 525/355, 367

[56] References Cited

U.S. PATENT DOCUMENTS 3,646,099  2/1972  Dannals ..................... 260/465.4
3,954,858  5/1976  Lamberti et al. ............ 260/513 N X

FOREIGN PATENT DOCUMENTS 1518561  7/1978  United Kingdom .

*Primary Examiner*—Michael R. Lusignan
*Assistant Examiner*—Thurman K. Page
*Attorney, Agent, or Firm*—Millen & White

[57] ABSTRACT

Hydrophilic cotelomers having a terminal sulphonate group, and having the formula:

$$H\text{---}\left[\begin{array}{cc} R_1 & R_2 \\ | & | \\ C\text{---}C \\ | & | \\ H & COOM \end{array}\right]_a \left[\begin{array}{cc} R_3 & R_4 \\ | & | \\ C\text{---}C \\ | & | \\ H & NH_2 \end{array}\right]_b \text{---}(A)_{\overline{c+d+e+f}}SO_3M'$$

wherein $R_1$, $R_2$, $R_3$ and $R_4$ are each independently H or $C_{1-4}$ alkyl; M is H or an alkali metal; M' is an alkali metal; $8 \leq a \leq 40$ and $1 \leq b \leq 20$. These cotelomers may also contain one or more of the following structural units, A;

$$\left[\begin{array}{cc} R_3 & R_4 \\ | & | \\ C\text{---}C \\ | & | \\ H & CONH_2 \end{array}\right]_c, \left[\begin{array}{cc} R_5 & R_6 \\ | & | \\ C\text{---}C \\ | & | \\ H & COOR_7 \end{array}\right]_d,$$

$$\left[\begin{array}{cc} R_8 & R_9 \\ | & | \\ C\text{---}C \\ | & | \\ H & Y \end{array}\right]_e \text{ and } \left[\begin{array}{cc} CH\text{---}CH \\ | & | \\ COOM & COOZ \end{array}\right]_f$$

wherein $R_3$, $R_4$, $R_5$ and $R_6$ are each independently H or $C_{1-4}$ alkyl; $R_7$ is $C_{1-8}$ alkyl; $R_8$ and $R_9$ are each independently H or $C_{1-2}$ alkyl; Y is aryl; M is H or an alkali metal; Z is M or $C_{1-8}$ alkyl; $0 \leq c \leq 2$; $0 \leq d \leq 3$; $0 \leq e \leq 2$; and $0 \leq f \leq 10$. Detergent powders containing from 10 to 50% by weight of these hydrophilic cotelomers instead of sodium tripolyphosphate have good detergent and anti-redeposition powers.

18 Claims, 1 Drawing Figure

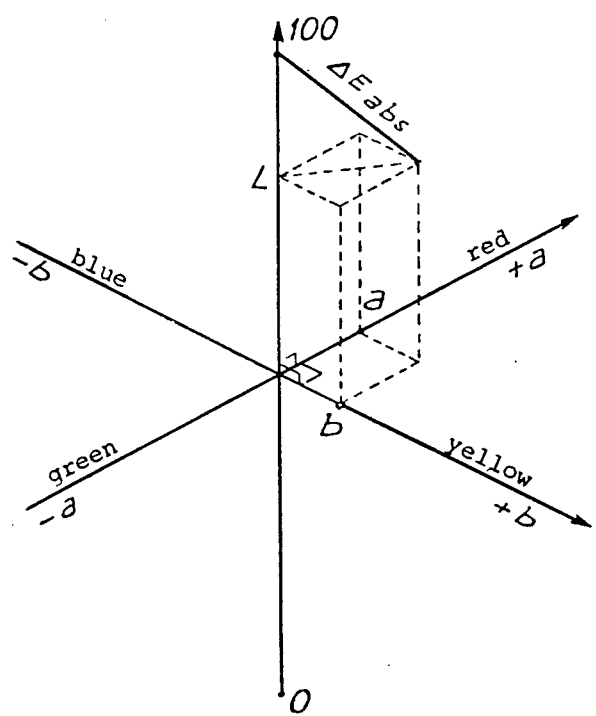

HYDROPHILIC COTELOMERS HAVING A TERMINAL SULFONATE GROUP AND CONTAINING ACID AND AMINE FUNCTIONS, AND THEIR APPLICATION IN DETERGENT COMPOSITIONS

BACKGROUND OF THE INVENTION

The present invention relates to hydrophilic cotelomers, having a terminal sulfonate group and containing acid and amine functions, as well as methods of preparing the cotelomers and compositions containing them.

Oligomers of acrylic acid and of acrylamide, having a terminal sulfonate group, are disclosed in U.S. Pat. No. 3,646,099. British Pat. No. 1,518,561 describes a process for modifying polymers of $\alpha,\beta$-unsaturated amides by halo-amidation of said polymers by means of a hypohalite in aqueous alkaline medium, followed by Hofmann rearrangement of the resulting halo-amide. This process is applied to products having average molecular weights higher than 5,000 and not containing any terminal sulfonate group. If the rearrangement reaction is partial and carried out at an excessively high temperature, the polymers obtained may simultaneously contain carboxylic acid, amide and amine groups.

OBJECTS OF THE INVENTION

One object of the present invention is to provide hydrophilic cotelomers having high complexing power towards calcium and magnesium ions.

Another object of the invention is to provide powdered detergent compositions containing little or no sodium tripolyphosphate but which nevertheless possess good detergent power and good anti-redeposition power for staining agents.

Upon further study of the specification and appended claims, further objects and advantages of this invention will become apparent to those skilled in the art.

SUMMARY OF THE INVENTION

Briefly, these and other objects are achieved by providing a hydrophilic cotelomer having a terminal sulfonate group, of the general formula:

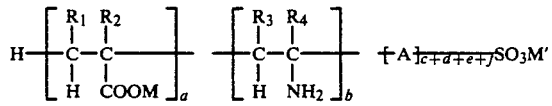

wherein $R_1$, $R_2$, $R_3$ and $R_4$ are each independently H or $C_{1-4}$-alkyl; M is H or an alkali metal; M' is an alkali metal; $8 \leq a \leq 40$; and $1 \leq b \leq 20$. It is understood that the $-R_1CH-CR_2(COOM)-$ units and the $-R_3CH-CR_4(NH_2)-$ units are randomly distributed in the cotelomer chain, the above formula showing only the number of each type of unit in an average molecule.

The cotelomer may optionally include structural units, A, having one or more of the formulae:

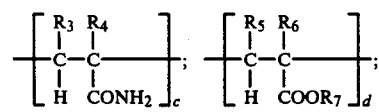

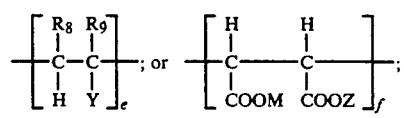

wherein $R_3$, $R_4$, $R_5$ and $R_6$ are each independently H or $C_{1-4}$-alkyl; $R_7$ is $C_{1-8}$-alkyl; $R_8$ and $R_9$ are each independently H or $C_{1-2}$-alkyl; Y is aryl; M is H or an alkali metal; Z is M or $C_{1-8}$-alkyl; $0 \leq c \leq 2$; $0 \leq d \leq 3$; $0 \leq e \leq 2$; and $0 \leq f \leq 10$.

Methods of preparing the foregoing cotelomers, and detergent compositions containing them, are also provided.

BRIEF DESCRIPTION OF THE DRAWING

The FIGURE is a schematic representation of the "cube root" chromaticity system.

DETAILED DISCUSSION

In the cotelomer of this invention, the substituents $R_1$, $R_3$, $R_5$, $R_8$ and $R_9$ are preferably H; $R_2$, $R_4$ and $R_6$ are preferably H or $CH_3$; $R_7$ is preferably $CH_3$ or $C_2H_5$; Y is preferably $C_{6-10}$ aryl, e.g., phenyl, substituted phenyl or naphthyl, most preferably phenyl; M' is preferably sodium; and when M and Z are an alkali metal, it is preferably sodium.

Cotelomers according to the invention advantageously have a weight average molecular weight (Mw) of 700–4800, preferably 1000–3000. Where the main structural units are derived from acrylic acid (or alkali metal acrylate) and vinylamine, the resultant cotelomer is very soluble in water.

The process for the production of the hydrophilic cotelomers according to the invention comprises the steps of:

(a) cotelomerizing, in aqueous solution, an acid of the formula $R_1-CH=CR_2-COOH$ or its alkali metal salt and an amide of the formula $R_3CH=CR_4-CONH_2$, in a molar ratio of acid to amide of 0.5 to 40, optionally in the presence of at least one of an ester of formula $R_5CH=CR_6-COOR_7$, an aromatic hydrocarbon having an ethylenic side chain of the formula $R_8CH=CR_9Y$, or a compound of the formula $MOOC-CH=CH-COOZ$, wherein $R_1$, $R_2$, $R_3$, $R_4$, $R_5$, $R_6$, $R_7$, $R_8$, $R_9$, M, Y and Z are as defined above, in the presence of an alkali metal bisulfite and of an oxidizing telomerization initiator, e.g., sodium or ammonium persulfate, hydrogen peroxide, or the like, at a temperature of 0°–100° C., and then, if necessary, neutralizing the resultant product with an alkali metal hydroxide to convert any COOH groups to their salt form; and (b) treating the neutralized product with an aqueous solution of an alkali metal hypohalite, in such a quantity that the molar ratio of alkali metal hypohalite to amide groups is 0.9–1.25, at a temperature of $-10°–10°$ C., and in the presence of an alkali metal hydroxide, in such a quantity that the molar ratio of alkali metal hydroxide to alkali metal hypohalite is 1.8–2.

Step (a) is carried out as described in U.S. Pat. No. 3,646,099. The average molecular weight of the cotelomer obtained is modulated by the use of a larger or smaller quantity of alkali metal bisulfite as chain control agent. When the reaction is complete, the reaction medium, containing substantially no more free monomers, is optionally treated with a strong base, so as to convert the acid functions present to salts.

Step (b) of the process effects a Hofmann degradation. It is carried out as described in British Pat. No. 1,518,561. When less than 1 molar equivalent of hypohalite is used, some of the amide groups remain in the final cotelomer, which then contains $-R_3CH-CHR_4(CONH_2)-$ structural units.

The ratio of acid to amide initially used is 0.5–40, as noted above. If all the amide groups are converted to amine functions in step (b), then the indices a and b will be in the ratio a/b of 0.5–40. If, as noted above, the ratio of hypohalite to amide is less than 1, e.g., 0.9, then some amide groups will remain, and the ratio a/b will be larger than the molar ratio of acid to amide cotelomerized in step (a), and the ratio c/b will range from 0 to about 0.2. Preferably, the ratio a/b is 4–8.

The structural units $-R_5CH-R_6CCOOR_7-$ and $-R_8CH-R_9CY-$ are normally minor constituents of the cotelomer, if they are present at all. The ratio d/b ranges from 0 to about 0.4, and the ratio e/b ranges from 0 to about 0.1.

The structural unit $-(COOM)CH-CHOOZ-$ provides additional carboxyl groups, and therefore may be present in a higher proportion in the cotelomer. The ratio f/b ranges from 0 to about 2.

The total content of the A units relative to the $-R_1CH-R_2CCOOM-$ and $-R_3CH-R_4CNH_2-$ units is advantageously low, so that the ratio $c+d+e+f/a+b$ ranges from 0 to about 1, preferably less than about 0.1.

The cotelomers may be separated from the reaction medium, or the solution produced in step (b) may be used directly to prepare a liquid detergent by adding other necessary ingredients. If a crude dry reaction product is sufficient, the solution from step (b) may be evaporated, e.g., by evaporation of water in a rotary evaporator at a temperature of below 80° C. and, preferably, under reduced pressure, e.g., 1–20 mm Hg. The resultant solid is a mixture of the cotelomer and the by-products formed during the Hofmann degradation, i.e., $Na_2CO_3$ and NaCl. This mixture is suitable for use in preparing powdered detergent compositions, wherein the cotelomer acts as a complexing agent.

If it is desired to obtain the cotelomer in the pure state, i.e., freed from accompanying inorganic salts, particularly from sodium chloride, the cotelomer is precipitated with methanol at ambient temperature. The reaction medium obtained in step (b) after the Hofmann degradation is agitated with methanol, followed by repeated and successive decantation. The cotelomer thus obtained in crystalline form, suspended in methanol, is then filtered and subsequently dried, preferably under reduced pressure.

The cotelomers of the invention are advantageously incorporated in detergent compositions. They possess high complexing power towards calcium and magnesium ions, good detergent power and good anti-redeposition power for staining agents during laundering. They are therefore suitable for the production of detergent powders in which they can replace the sodium tripolyphosphate (TPP) currently used. Advantageously, the detergent powder contains little or no TPP or other phosphates, e.g., not more than about 5% by weight, preferably not more than about 1% by weight, and it is most preferably substantially free of TPP, i.e., substantially phosphate-free.

Typical detergent powders according to the invention contain:
from 10 to 50% by weight of cotelomers according to the invention, either pure or accompanied by the inorganic by-products formed during the Hofmann degradation reaction; in the latter case, $Na_2CO_3$ is also present in the crude cotelomer;

from 1 to 30% by weight of a bleaching agent, e.g., inorganic peroxides such as sodium percarbonate or sodium perborate, hydroperoxides of alkali metal mono- or polyalkylaryl sulfonates such as those disclosed in U.S. Pat. No. 4,294,717 or mixtures of these bleaching agents; the compositions of hydroperoxides of alkali metal mono- or polyalkylaryl sulfonates may have been treated, prior to their use, with hydrogen peroxide to increase their bleaching power, as described in European patent application No. 28,186;

other conventional ingredients well known to those skilled in the art, such as from 5 to 80% by weight of a surfactant, comprising one or more anionic detergents, most frequently of the sodium alkyl- or arylsulfonate type, for example, sodium dodecylbenzenesulfonate, and/or one or more soaps, such as sodium tallow soap, and/or one or more nonionic detergents, such as polyoxyethylene derivatives or polyoxypropylene derivatives of alcohols or glycols;

from 1 to 10% by weight of sodium silicate;

from 0.01 to 1% by weight of conventional scents, colorants and optical whiteners;

the balance to 100% by weight, if any, in the form of one or more inorganic builders, such as sodium sulfate, sodium carbonate or mixtures thereof.

The detergent and anti-redeposition power of the cotelomers according to the invention is particularly high with respect to blood stains, cocoa stains and the complex stain BMI (blood/milk/ink).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES 1 TO 8

Production of Cotelomers According to the Invention

Water and the monomers indicated in Table I were placed in a 2-liter reactor, equipped with a stirrer and regulated heating and cooling means. Sodium bisulfite, in the form of a 35 wt% aqueous solution, was then introduced over 30 minutes, the temperature being kept at 15°–20° C. A 10% by weight aqueous solution of ammonium persulfate was introduced into this mixture, which was kept well stirred and maintained at the same temperature, at the rate of 0.5 ml/hour during from 6 to 8 hours. The mixture was then boiled for one hour and cooled back down to ambient temperature. The acid groups of the resultant cotelomer were subsequently neutralized with a 28% by weight aqueous caustic soda solution, with the quantity theoretically required with respect to the acid groups present. The reaction medium was cooled to 0° C. and was maintained at that temperature while a solution of sodium hypochlorite of 48 chlorometric degrees and a 22% by weight solution of caustic soda were introduced. At the end of one hour, the temperature was allowed to rise naturally to ambient and ambient temperature was maintained for one hour. Table I describes the quantities of reagents used for each cotelomer prepared.

TABLE I

| | Reagents | | | | | | | | | | neutrali-zation | 2nd step | |
|---|---|---|---|---|---|---|---|---|---|---|---|---|---|
| | Monomers | | | | | | | | | | | | |
| Example | Acrylic Acid g | Acryl-amide g | Meth-acrylic acid g | Meth-acryl-amide g | Methyl acrylate g | Styrene g | Maleic acid g | Water g | BS* g | PS* ml | S* g | HC* g | S'* g |
| 1 | 288 | 71 | — | — | — | — | — | 560 | 148 | 3.5 | 568 | 684 | 358 |
| 2 | 288 | 71 | — | — | — | — | — | 560 | 90 | 3 | 568 | 684 | 360 |
| 3 | 288 | 71 | — | — | — | 3.6 | — | 600 | 80 | 4 | 568 | 625 | 330 |
| 4 | 216 | 71 | 86 | — | — | 3 | — | 600 | 90 | 3 | 568 | 684 | 360 |
| 5 | 270 | 71 | — | — | 21.5 | — | — | 580 | 100 | 3 | 533 | 684 | 350 |
| 6 | 270 | 71 | — | — | 21.5 | 3 | — | 580 | 100 | 3 | 533 | 655 | 350 |
| 7 | 216 | 35.5 | 86 | 42.5 | — | 2 | — | 600 | 100 | 3.5 | 568 | 600 | 320 |
| 8 | 288 | 71 | — | — | — | 4 | 44 | 580 | 120 | 3.5 | 678 | 684 | 360 |

*BS: Aqueous sodium bisulfite solution, 35% by weight
PS: Aqueous ammonium persulfate solution, 10% by weight
S: Aqueous sodium hydroxide solution, 28.1% by weight
HC: Aqueous hypochlorite solution, 48 chlorometric deg.
S': Aqueous sodium hydroxide solution, 22% by weight The reaction product was then recovered and purified in the following way: 80 parts of methanol were added to 100 parts of reaction medium, with stirring and at ambient temperature. After a contact time of about 5 minutes, stirring was stopped and the mixture was allowed to settle. Two layers were formed, the lower layer consisting of from 56 to 57 parts of an oily product. This product was taken up, with stirring, in 40 parts of methanol at 0° C. and decantation was resumed. This operation was repeated three times and a suspension in methanol was obtained of a finely divided product, which was filtered and dried in a desiccator at aspirator pressure.

The composition of each cotelomer thus obtained is shown in Table II, using the indices a-f, corresponding to the general formulae shown above. The acid groups are in the form of their sodium salts, i.e., M=M'=Na.

The values of the indices and the molecular weight are calculated from analytical data for the purified cotelomers. Conventional analyses for sulfur and nitrogen contents, by weight, are performed. The weight average molecular weight (Mw) is calculated from the sulfur content, since each cotelomer molecule contains a single sulfur atom, in its sulfonate terminus. The amine and amide contents (indices b and c) are controlled by the amount of hypohalite added in the Hofmann degradation step, and can also be calculated from the nitrogen content, which is higher the more amine is produced.

The complexing power, expressed in mg of calcium ions per gram of cotelomer, was measured by titration of a solution of Ca++ ions at pH 10 with a cotelomer solution in the presence of an electrode specific for Ca++ ions.

TABLE II

| Example | Mw | a | b | c | d | e | f | Complexing Power |
|---|---|---|---|---|---|---|---|---|
| 1 | 1070 | 9.4 | 1.83 | 0 | 0 | 0 | 0 | 110 |
| 2 | 2200 | 21.2 | 2.8 | 0.1 | 0 | 0 | 0 | 110 |
| 3 | 2910 | 27.7 | 4.2 | 0.4 | 0 | 0.15 | 0 | 105 |
| 4 | 2130 | 19.3* | 3.5 | 0 | 0 | 0.12 | 0 | 105 |
| 5 | 2000 | 18.1 | 3 | 0.2 | 0.9 | 0 | 0 | 102 |
| 6 | 2000 | 18 | 2.8 | 0.3 | 0.8 | 0.1 | 0 | 100 |
| 7 | 2100 | 17.8xx | 3.1xxx | 0.5xxxx | 0 | 0.07 | 0 | 108 |
| 8 | 1550 | 12 | 2.4 | 0 | 0 | 0.12 | 1.2 | 110 |

*of which 12 are in the form of sodium acrylate groups and 7.3 are in the form of sodium methacrylate groups
xxof which 14 are Na acrylate, 3.8 are Na methacrylate
xxxof which 1.5 are vinylamine, 1.6 are methylvinylamine
xxxxof which 0.3 are acrylamide, 0.2 are methylacrylamide

EXAMPLES 9 TO 27

Detergent Compositions

The efficiency of detergent powders containing cotelomers according to Examples 1 to 5, was evaluated by three series of tests:
- measurement of the anti-redeposition power;
- measurement of the detergent power;
- measurement of the detergent power in the presence of a white cotton sponge cloth.

In order to determine the anti-redeposition power, a commercially available white cotton sponge cloth was washed ten times in succession in the presence of a sample of a test stain, this sample having been renewed after each washing.

In order to determine the detergent power, fabric samples stained with several, e.g., 3 or 4, different test stains, were washed together.

The detergent compositions were prepared as described in U.S. Pat. No. 4,294,717. 600 ml of water and 1.2 g of detergent powder were used in the anti-redeposition tests, while 6 g of detergent powder were used in the detergent powder tests.

The washings were carried out on fabric samples supplied by the Federal Laboratory for testing materials, St. Gollen, Switzerland, impregnated with the following staining agents: blood, red wine, immedial black (sulphur black tincture), cocoa, BMI (blood/milk/India ink), 101 (carbon black+grease), which are denoted blood, wine, black, cocoa, BMI and 101, respectively.

The anti-redeposition power and the detergent power are measured by means of the uniform L, a, b, "cube root" chromaticity system (1958). In this system, schematically represented in the drawing, "L" represents the "pure" whiteness degree (Luminance) between absolute black (0) and pure white (100); "a" is, according to its sign, a color tending towards green (negative values) or towards red (positive values), and "b" a color tending towards blue (negative values) or towards yellow (positive values). In this system with three perpendicular axes, the value obtained for a sample will be represented by a point. The distance from this point to another, representing the total chromaticity variation between both, is such that:

$$\Delta E = \sqrt{(L_1 - L_2)^2 + (a_1 - a_2)^2 + (b_1 - b_2)^2}$$

Taking as reference point $L_1$, $a_1$, $b_1$ (100,0,0) representing "pure" maximum theoretical whiteness, the absolute chromaticity variation for the measured sample (L,a,b) will be equal to:

$$\Delta E = \sqrt{(100 - L)^2 + a^2 + b^2}$$

The lower this value, the better the washing.

The values L, a and b are given directly by the measuring apparatus, a reflexion colorimeter.

The detergent powders used had the following composition by weight:

| | |
|---|---|
| sodium dodecylbenzene sulfonate, containing about 50% active material | 10% |
| sodium tallow soap | 7% |
| nonionic detergent | 6% |
| sodium silicate, containing about 44% active material | 10% |
| sodium perborate tetrahydrate | 25% |
| cotelomer according to the invention | See Tables IV and V |
| sodium sulfate and/or carbonate | balance to 100% |

Anti-redposition power (Examples 9 to 12)

A sample of white cotton sponge cloth, having an initial $\Delta E$ equal to 8.8, was washed first with a solution of a powder as described above, in the presence of a fabric sample impregnated with a given stain, the nature of which is shown in Table III. At the end of the first washing, the washing bath and the sample of fabric, impregnated with the stain, were withdrawn. The washing bath and the fabric, impregnated with the same type of stain, were renewed and a second washing of the original sample of white cotton sponge cloth was carried out. This procedure was followed ten times in succession. At the end of the ten washings, the values for $\Delta E$, indicated in Table III for the white cotton sponge cloth, were obtained. In Comparative Example 12, sodium tripolyphosphate (TPP) was used instead of a cotelomer according to the invention.

TABLE III

| | Cotelomer | | ΔE | | | | |
|---|---|---|---|---|---|---|---|
| Example | Example | % by weight in the detergent powder | black | blood | cocoa | wine | BMI |
| 9 | 1 | 18.5 | 13.8 | 25.7 | 13.3 | 9.3 | 20.1 |
| 10 | 1 | 37 | 8.8 | 8.7 | 8.2 | 7.8 | 8.1 |
| 11 | 2 | 18.5 | 9.9 | 9.8 | 10.4 | 9.2 | 10.4 |
| 12 | TPP | 40 | 9.8 | 11.6 | 9 | 9 | 7.9 |

Detergent power (Examples 13 to 19)

Four fabric samples, impregnated with the stains shown in Table IV, were simultaneously washed in the same bath with a detergent powder as described above. Each of Examples 13 to 19 comprises three mutually independent tests A, B, C which differ in the stain combinations. After one single washing, the values for $\Delta E$, recorded in Table IV, were obtained. The initial values for $\Delta E$ of each fabric impregnated with a given stain, are shown in Table IV in the row denoted "control".

By way of comparison, in Example 19, the cotelomer of the invention was replaced by sodium tripolyphosphate (TPP).

Detergent power in the presence of a white cotton sponge cloth (Examples 20 to 26)

Three fabric samples, impregnated with the stains shown in Table V, and a sample of white cotton sponge cloth were simultaneously washed in the same bath containing a detergent powder as described above. Each of Examples 20 to 26 comprises three mutually independent tests, A, B, C which differ in the stain combinations.

TABLE IV

| | Cotelomer | | ΔE | | | | | | | | | | | |
|---|---|---|---|---|---|---|---|---|---|---|---|---|---|---|
| | | | A | | | | B | | | | C | | | |
| Example | Example | % by weight | black+cocoa+blood+101 | | | | black+cocoa+BMI+101 | | | | black+BMI+blood+wine | | | |
| | Control | | 29.5 | 40 | 57 | 52 | 29.5 | 40 | 59.5 | 52 | 29.5 | 59.5 | 57 | 31 |
| 13 | 1 | 37 | 22.4 | 35.2 | 8.5 | 29.8 | 17 | 15.4 | 27.6 | 26.7 | 21.2 | 43.3 | 9.2 | 7.1 |
| 14 | 1 | 18.5 | 24.7 | 42.8 | 8.5 | 27.4 | 16.8 | 16 | 36.2 | 22.7 | 24.4 | 43.6 | 7.8 | 7.5 |
| 15 | 2 | 21 | 23.2 | 28.5 | 9.1 | 29.3 | 16.8 | 14.1 | 38.3 | 25.6 | 21.9 | 36.8 | 8.3 | 7.4 |
| 16 | 3 | 19 | 26.1 | 15.3 | 17.9 | 31.9 | 24.8 | 14.4 | 39.6 | 30.4 | 25.4 | 40.1 | 16.7 | 7 |
| 17 | 4 | 20 | 32.9 | 41.7 | 10.2 | 30.5 | 26.4 | 14 | 36.6 | 28.7 | 33.6 | 40.6 | 9.9 | 10.5 |
| 18 | 5 | 20 | 26.3 | 16.8 | 12.9 | 34.1 | 25 | 12.6 | 33.7 | 30.4 | 26.8 | 33.6 | 15.8 | 6.7 |
| 19 | TPP | 40 | 22 | 34.1 | 10 | 31.8 | 16.8 | 18.3 | 30.7 | 28.1 | 22.4 | 47.5 | 9.6 | 8.8 |

After one single washing the values for $\Delta E$, recorded in Table V, were obtained. By way of comparison, in Example 26, sodium tripolyphosphate (TPP) was used in place of the cotelomer of the invention in the detergent powder.

EXAMPLES 27 AND 28

The tests described in Examples 9 to 26 were all effected with the aid of a detergent powder containing, as bleaching agent, 25% by weight of sodium perborate tetrahydrate. In Example 27, this quantity of sodium perborate was entirely replaced by 10% by weight of a bleaching composition according to Example VIII of U.S. Pat. No. 4,294,717, containing, by weight, 50% of sodium cumenesulfonate hydroperoxide, 40% of unconverted sodium cumenesulfonate and 10% of the alcohol resulting from the decomposition of the hydroperoxide. The detergent powder contains 37% of the cotelomer of Example 1. The other ingredients are those disclosed for the detergent powders of Examples 9-12. A solution of this powder was used to wash a fabric sample, stained with BMI, and produced a ΔE of 36.1.

In Example 28, the same procedure as Example 27 was effected with a powder containing 37% of the cotelomer of Example 1 and 25% of sodium perborate tetrahydrate resulting in a ΔE of 48.2.

The preceding examples can be repeated with similar success by substituting the generically or specifically described reactants and/or operating conditions of this invention for those used in the preceding examples.

or $CH_3$; $R_7$ is $CH_3$ or $C_2H_5$; Y is phenyl; and M, M' and Z are each Na.

5. A dry, powdered detergent composition comprising a bleaching agent, at least one surfactant, sodium silicate, and 10-50% by weight of a hydrophilic cotelomer having the formula

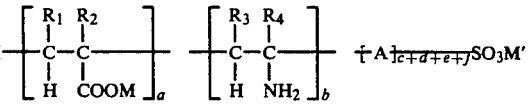

TABLE V

| Example | Cotelomer Example | % by weight | ΔE A cocoa+blood+101+cotton | | | | ΔE B cocoa+BMI+101+cotton | | | | ΔE C BMI+blood+wine+cotton | | | |
|---|---|---|---|---|---|---|---|---|---|---|---|---|---|---|
| | | Control | 40 | 57 | 52 | 8.8 | 40 | 59.5 | 52 | 8.8 | 59.5 | 57 | 31 | 8.8 |
| 20 | 1 | 37 | 33.2 | 6 | 29.3 | 8.4 | 12.1 | 26.2 | 27.1 | 8.6 | 43.3 | 7.4 | 6.4 | 8.2 |
| 21 | 1 | 18.5 | 29.2 | 6.7 | 27.7 | 8.5 | 14.3 | 35.5 | 22.7 | 8.7 | 42.7 | 6.4 | 6 | 8.7 |
| 22 | 2 | 21 | 25.6 | 6.6 | 28.1 | 8.9 | 12.2 | 34.3 | 25.5 | 8.5 | 43 | 7.3 | 6.5 | 8.1 |
| 23 | 3 | 19 | 12.9 | 13.3 | 28.3 | 8.8 | 15.1 | 39.3 | 29.9 | 9 | 41.6 | 16.2 | 5.8 | 8.4 |
| 24 | 4 | 20 | 42.7 | 8.7 | 30.4 | 8.3 | 14.7 | 37.3 | 27.7 | 7.7 | 40 | 8.6 | 12.2 | 8.1 |
| 25 | 5 | 20 | 13.2 | 12.1 | 29.3 | 8.7 | 11.1 | 35.2 | 30.2 | 8.3 | 36.1 | 14.3 | 5.8 | 8.6 |
| 26 | TPP | 40 | 36.8 | 7.9 | 31.9 | 9.3 | 17.2 | 26.9 | 28.3 | 9 | 46.2 | 10.1 | 10.1 | 8.3 |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A hydrophilic cotelomer having a terminal sulfonate group, having the formula

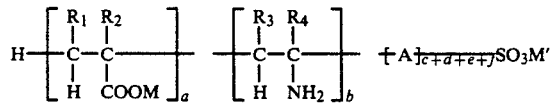

wherein $R_1$, $R_2$, $R_3$ and $R_4$ are each independently H or $C_{1-4}$ alkyl; M is H or an alkali metal; M' is an alkali metal; $8 \leq a \leq 40$; and $1 \leq b \leq 20$; and A represents structural units having at least one of the formulae:

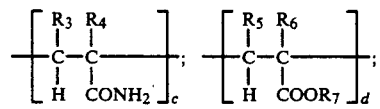

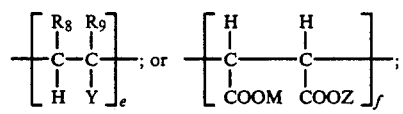

wherein $R_3$, $R_4$, $R_5$ and $R_6$ are each independently H or $C_{1-4}$ alkyl; $R_7$ is $C_{1-8}$ alkyl; $R_8$ and $R_9$ are each independently H or $C_{1-2}$ alkyl; Y is aryl; M is H or an alkali metal; Z is M or $C_{1-8}$ alkyl; $0 \leq c \leq 2$; $0 \leq d \leq 3$; $0 \leq e \leq 2$; and $0 \leq f \leq 10$.

2. The cotelomer of claim 1, wherein c, d, e and f are each 0.

3. The cotelomer of claim 2, wherein $R_1$ and $R_3$ are H; $R_2$ and $R_4$ are each independently H or $CH_3$; and M' is Na.

4. The cotelomer of claim 1, wherein $R_1$, $R_3$, $R_5$, $R_8$ and $R_9$ are H; $R_2$, $R_4$ and $R_6$ are each independently H wherein $R_1$, $R_2$, $R_3$ and $R_4$ are each independently H or $C_{1-4}$ alkyl; M is H or an alkali metal; M' is an alkali metal; $8 \leq a \leq 40$; and $1 \leq b \leq 20$; and A represents structural units having at least one of the formulae:

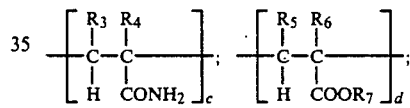

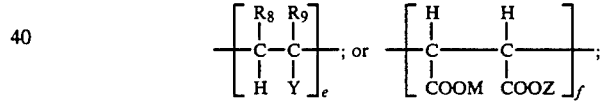

wherein $R_3$, $R_4$, $R_5$ and $R_6$ are each independently H or $C_{1-4}$ alkyl; $R_7$ is $C_{1-8}$ alkyl; $R_8$ and $R_9$ are each independently H or $C_{1-2}$ alkyl; Y is aryl; M is H or an alkali metal; Z is M or $C_{1-8}$ alkyl; $0 \leq c \leq 2$; $0 \leq d \leq 3$; $0 \leq e \leq 2$; and $0 \leq f \leq 10$.

6. The detergent composition of claim 5, wherein said bleaching agent is alkali metal mono- or polyalkylarylsulfonate hydroperoxide; and wherein the amount of said bleaching agent in said composition is 1-30% by weight.

7. The detergent composition of claim 5, wherein said bleaching agent is a hydrogen peroxide-treated mono- or polyalkylarylsulfonate hydroperoxide.

8. The detergent composition of claim 5, which contains not more than about 55% by weight of phosphates.

9. The detergent composition of claim 5, which contains not more than about 11% by weight of phosphates.

10. The detergent composition of claim 5, which is substantially phosphate-free.

11. The detergent composition of claim 5, wherein c, d, e and f are each 0.

12. The cotelomer of claim 1, having a weight average molecular weight of 700-4800.

13. The cotelomer of claim 1, wherein Y is a $C_{6-10}$ aryl group.

14. The cotelomer of claim 12, wherein Y is a $C_{6-10}$ group.

15. The detergent composition of claim 5, having a weight average molecular weight of 700-4800.

16. The detergent composition of claim 5, wherein Y is a $C_{6-10}$ aryl group.

17. The detergent composition of claim 15, wherein Y is a $C_{6-10}$ aryl group.

18. The detergent composition of claim 5, which further comprises at least one of sodium carbonate or sodium sulfate.

* * * * *

UNITED STATES PATENT AND TRADEMARK OFFICE
CERTIFICATE OF CORRECTION

PATENT NO. : 4,379,068

DATED : April 5, 1983

INVENTOR(S) : PIERRE COUDERC

It is certified that error appears in the above-identified patent and that said Letters Patent is hereby corrected as shown below:

Column 10, Line 58: reads "tains not more than about 55% by weight of phosphates."

should read -- tains not more than about 5% by weight of phosphates. --

Column 10, Line 60: reads "tains not more than about 11% by weight of phosphates."

should read -- tains not more than about 1% by weight of phosphates. --

Signed and Sealed this

Sixteenth Day of August 1983

[SEAL]

Attest:

GERALD J. MOSSINGHOFF

Attesting Officer

Commissioner of Patents and Trademarks